US008789869B2

(12) United States Patent
Bouldron

(10) Patent No.: US 8,789,869 B2
(45) Date of Patent: Jul. 29, 2014

(54) STORAGE DEVICE INCLUDING OPENING ASSISTANCE FOR A MOTOR VEHICLE

(75) Inventor: Ludovic Bouldron, Pontoise (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/808,095

(22) PCT Filed: Jun. 29, 2011

(86) PCT No.: PCT/FR2011/051519
§ 371 (c)(1),
(2), (4) Date: Apr. 16, 2013

(87) PCT Pub. No.: WO2012/001306
PCT Pub. Date: Jan. 5, 2012

(65) Prior Publication Data
US 2013/0193707 A1    Aug. 1, 2013

(30) Foreign Application Priority Data
Jul. 2, 2010 (FR) .................................. 10 55342

(51) Int. Cl.
*B60R 7/04* (2006.01)
*E05B 65/12* (2006.01)
*E05B 17/00* (2006.01)

(52) U.S. Cl.
CPC . *B60R 7/04* (2013.01); *E05B 83/32* (2013.01); *E05B 17/0037* (2013.01); *Y10S 292/03* (2013.01); *Y10S 292/72* (2013.01)
USPC .................. 296/37.8; 296/24.34; 292/DIG. 3; 292/DIG. 72

(58) Field of Classification Search
CPC ......... B60R 7/04; B60R 7/06; E05B 17/0033; E05B 17/0037; E05B 65/52; E05B 65/5246; E05B 65/5253; E05B 65/5261; E05B 65/5269; E05B 83/32; E05C 3/006; E05C 3/008; E05C 3/16; E05C 3/22; E05C 3/30; E05C 3/34
USPC .............. 296/1.09, 24.34, 37.1, 37.8, 100.02; 49/293, 339; 292/24, 25, 26, 95, 96, 292/129, 249, DIG. 3, DIG. 72
See application file for complete search history.

(56) References Cited

U.S. PATENT DOCUMENTS

| | | | |
|---|---|---|---|
| 6,113,160 A | 9/2000 | Johansson et al. | |
| 2006/0208525 A1* | 9/2006 | Jonsson | 296/100.02 |

(Continued)

FOREIGN PATENT DOCUMENTS

| | | |
|---|---|---|
| DE | 8704947 | 5/1987 |
| DE | 4407522 | 6/1995 |

(Continued)

OTHER PUBLICATIONS

International Search Report for PCT/FR2011/051519 dated Oct. 13, 2011, 3 pages (translated).

*Primary Examiner* — Glenn Dayoan
*Assistant Examiner* — Jason S Daniels
(74) *Attorney, Agent, or Firm* — Reising Ethington P.C.

(57) ABSTRACT

A storage device, including a storage body and a cover that is movable between an open position and a closed position. The device includes a locking mechanism that is movable between a locking position and an unlocking position, an elastic return member being arranged so as to move the locking mechanism back into the locking position. The device includes at least one pusher part that is movable between a refracted position and an extracted position in which the pusher part keeps the cover in a partially open position. The elastic return member is arranged so as to push the pusher part into the extracted position thereof when the locking mechanism is in the unlocking position.

11 Claims, 5 Drawing Sheets

(56) References Cited

U.S. PATENT DOCUMENTS

2007/0080553 A1\* 4/2007 Kim .............................. 296/37.1
2008/0172945 A1\* 7/2008 Hoffman ......................... 49/386

FOREIGN PATENT DOCUMENTS

| DE | 10158383 | 6/2003 |
| FR | 2935320 | 3/2010 |

\* cited by examiner

STORAGE DEVICE INCLUDING OPENING ASSISTANCE FOR A MOTOR VEHICLE

TECHNICAL FIELD

The present invention relates to an inner storage device for a motor vehicle.

BACKGROUND

An inner storage device for a motor vehicle may comprise a storage body, delimiting a storage area accessible through an opening, and a cover movable between an open position, in which the storage area is accessible, and a closed position, in which the cover closes off the opening. The device may also include a locking mechanism movable between a locked position, in which the locking mechanism keeps the cover in the closed position, and an unlocked position, in which the locking mechanism allows the cover to go from its closed position to its open position, an actuating member making it possible to bring said locking mechanism from its locked position to its unlocked position when the actuating member is actuated, and at least one elastic return member being arranged to return the locking mechanism to the locked position when the actuating member is not actuated. The device may also include at least one push-piece arranged between the cover and the storage body, the piece being movable between a retracted position and an extracted position in which the push-piece keeps the cover in a partially open position.

Such a storage device may be, for example, a motor vehicle glove box.

Such a storage device is generally provided with a cover closing off the storage area and kept in the closed position by the locking mechanism. An actuating member, generally in the form of a pushbutton or handle, makes it possible to deactivate the locking mechanism so as to allow opening of the cover.

Document FR 2 935 320 describes such a storage device that also comprises thrust mechanism designed to maneuver the cover from its closed position to a partially open position.

Such a thrust mechanism make it possible to lend the storage device a high "perceived quality" by offering opening assistance making it possible to have a particularly precise opening path for the cover. Furthermore, such thrust mechanism makes it possible to indicate to the user whether the cover is closed correctly reliably simply by observing the position thereof.

However, such a device is complex to implement, since the thrust mechanism may comprise several parts separate from the locking and actuating mechanisms, which increases the number of elements to be managed during assembly of the storage device.

Furthermore, in this device, the thrust mechanism is arranged across from the edge of the cover, which makes it visible when the cover is in the open position. This arrangement is detrimental to the esthetics of the storage device.

SUMMARY

One of the aims of the invention is to offset these drawbacks by proposing a storage device comprising opening assistance done more simply and with fewer parts, while preserving a high "perceived quality" and satisfactory esthetics.

To that end, in accordance with at least one embodiment of the invention, there is provided a storage device of the aforementioned type, wherein the elastic return member is also arranged to push said push-piece toward its extracted position when the locking mechanism is in the unlocked position.

The push-piece is therefore actuated by the same elastic return member that allows the locking mechanism to go to the locked position. Thus, it is not necessary to provide a different return member for the push-piece, which reduces the number of parts necessary to produce the device, while preserving the opening assistance function and the high "perceived quality." Furthermore, in this device, the push-piece is arranged close to the locking mechanism, which is not immediately visible when the cover is opened. The esthetics of the storage device are therefore improved.

According to other features of the storage device:

- the locking mechanism comprises at least one retaining element secured to the storage body and a locking element rotatably mounted on the cover, said locking element cooperating with the retaining element in the locked position and being spaced away from said retaining element in the unlocked position;
- the elastic return member is mounted around the axis of rotation of the locking element and comprises a first end part bearing on a surface of the cover so as to return the locking element to the locked position and a second end part bearing on the push-piece so as to push it toward its extracted position;
- the actuating member is rotatably mounted on the cover and comprises a tongue bearing on the locking element so as to cause it to go to an unlocked position against the return force of the return member when the actuating member is actuated, said tongue being returned to its initial position by the locking element when the actuating member is not actuated;
- the retaining element comprises a bolt and the locking element comprises a strike;
- the locking mechanism comprises two retaining elements arranged on either side of a storage body in a transverse direction, the locking element comprising a shaft extending transversely and comprising a strike at each of its end portions, said strikes each cooperating with an element for retaining the locking position;
- the retaining element is hook-shaped, the cover comprising a shoulder arranged across from the retaining element, the retaining element cooperating with said shoulder in case of deformation of the storage device causing a relative longitudinal movement of the cover relative to the storage body bringing the shoulder closer to the retaining element;
- the push-piece comprises a body secured to a cover and a head translatable relative to the body along an axis substantially perpendicular to the cover, the return member exerting a thrust on said head so as to push it toward its extracted position;
- a compression spring is mounted between the body and the head, said spring pushing the head toward its extracted position;
- the storage device comprises two push-pieces arranged on either side of the cover in a transverse direction, two return members being arranged each to push a push-piece toward its extracted position and to return the locking mechanism to the locked position when the actuating member is not actuated; and
- the cover is rotatably mounted relative to the storage body around a transverse axis of rotation extending near a front transverse edge of said storage body, the locking mechanism, the actuating member, the push-piece and the return member being arranged near the opposite rear transverse edge of the storage body.

BRIEF DESCRIPTION OF THE DRAWINGS

Other features and advantages of the invention will appear upon reading the following description, provided as an example and done in reference to the appended drawings, in which.

DETAILED DESCRIPTION

In the description, the terms "front" and "rear" are defined in the usual directions of an assembled motor vehicle. The term "longitudinal" is defined along the length of the vehicle, i.e., in a front-to-back direction, and the term "transverse" is defined along the width of the vehicle, i.e., in a horizontal direction substantially perpendicular to the longitudinal direction.

Figure 1:
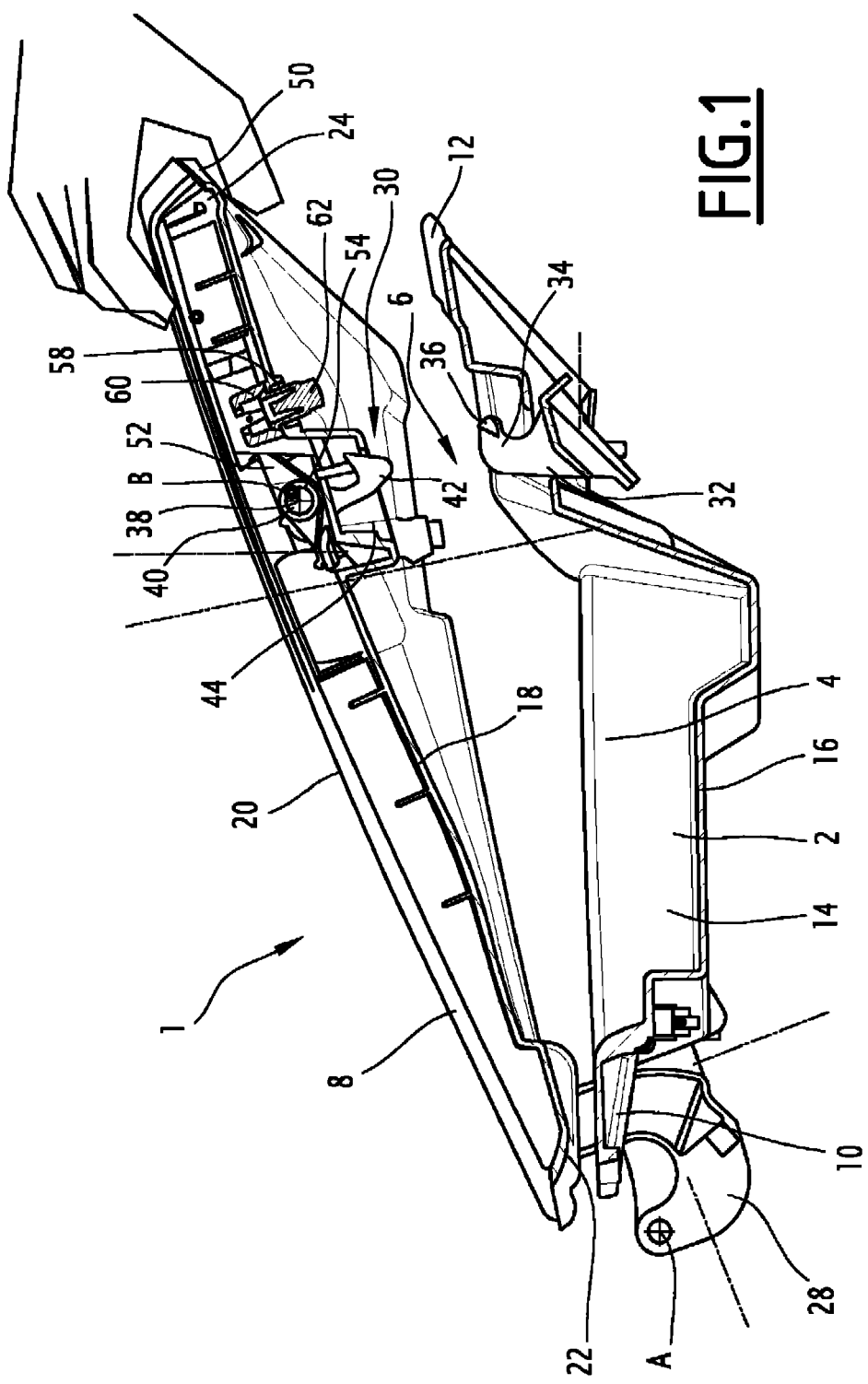
FIG. 1 is a diagrammatic cross-sectional illustration of a storage device according to one embodiment of the invention.

In reference to FIG. 1, an inner storage device 1 for a motor vehicle is described, for example of the glove box type, comprising a storage body 2, delimiting a storage area 4 accessible through an opening 6, closed by a cover 8. The storage device 1 is for example designed to be incorporated into a dashboard (not shown) of a motor vehicle. The storage device 1 shown in the figures is particularly well suited to be arranged above and in front of the speedometer and other indicators of the dashboard.

The storage body 2 is delimited by a front transverse edge 10 and a rear transverse edge 12, connected to each other by two longitudinal walls 14 spaced apart from one another in the transverse direction and connected by a bottom 16. The transverse edges 10 and 12, the longitudinal walls 14 and the bottom 16 delimit the storage space 4, as shown in FIG. 1.

Figure 2:
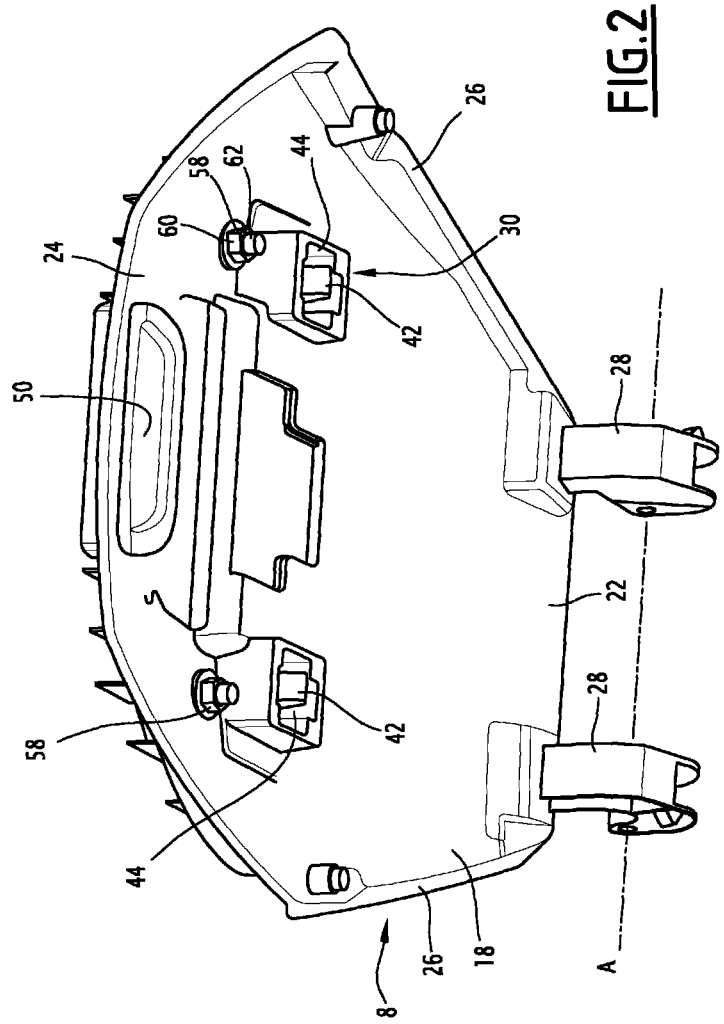
FIG. 2 is a diagrammatic perspective illustration of the cover of the storage device according to an embodiment of the invention, seen from below.

The cover 8 is rotatably mounted on the storage body 2 around a transverse axis A extending in the vicinity of the front transverse edge 10 of said body 2. The cover 8 is thus movable between a closed position, in which it covers the storage body 2 so as to close off the opening 6 and close the storage space 4, and an open position, shown in FIG. 1, in which the storage space 4 is accessible through the opening 6. The cover 8 comprises an inner wall 18 extending opposite the bottom 16 and an outer trim wall 20 designed to extend in the passenger compartment of the motor vehicle, for example in the continuation of the dashboard. The inner 18 and outer 20 walls extend between a front edge 22, arranged opposite the front transverse edge 10 of the body 2, a rear transverse edge 24, arranged opposite the rear edge 12 of the body 2, and two longitudinal edges 26, extending opposite the longitudinal walls 14 of the body 2. The cover 2 is rotatably mounted on the body 2 by two tabs 28 extending perpendicular to the inner wall 18 under the rear edge 12 and in the vicinity of the longitudinal edges 26, as shown in FIGS. 1 and 2.

The storage device 1 comprises locking mechanism 30 locking the cover 8 in the closed position. The locking mechanism 30 comprises at least one retaining element 32 secured to the storage body 2, in the vicinity of the rear transverse edge 12 and a longitudinal wall 14 thereof. The retaining element 32 forms a hook protruding from the bottom 16 of the storage body 2 and has a recess 34 extending toward the back, substantially parallel to the bottom 16 in the storage space 4. A bolt 36 is supported by the recess 34. According to the embodiment shown in the figures, the locking mechanism 30 comprises two retaining elements 32, positioned on either side of the storage body 2 in a transverse direction, i.e. each retaining element 32 is located in the vicinity of one of the longitudinal walls 14 of the body 2.

Figure 4:
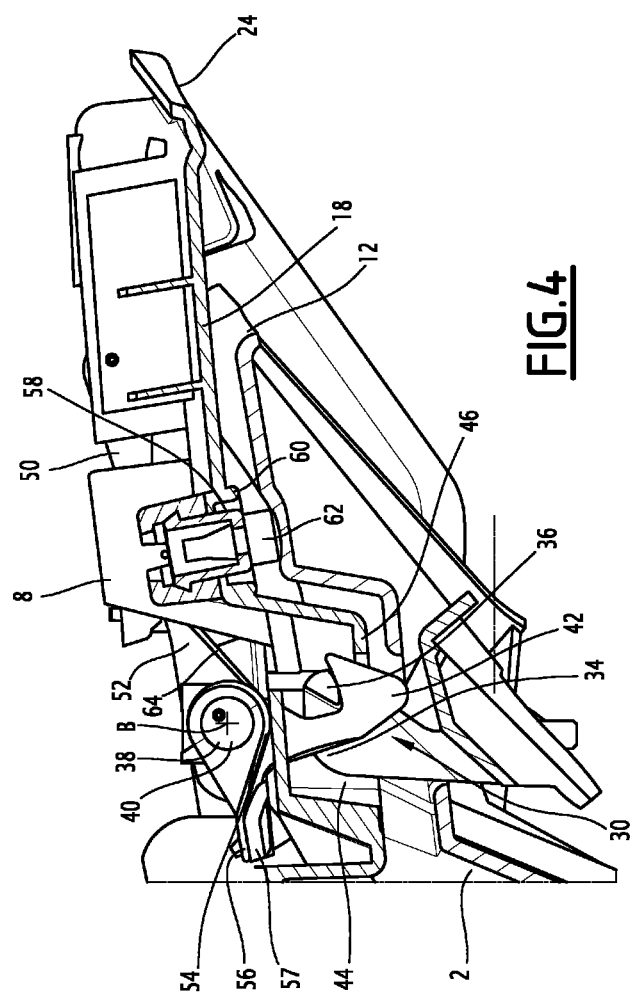
FIG. 4 is a diagrammatic cross-sectional illustration of part of the storage device, the cover being in the closed position.
Figure 5:
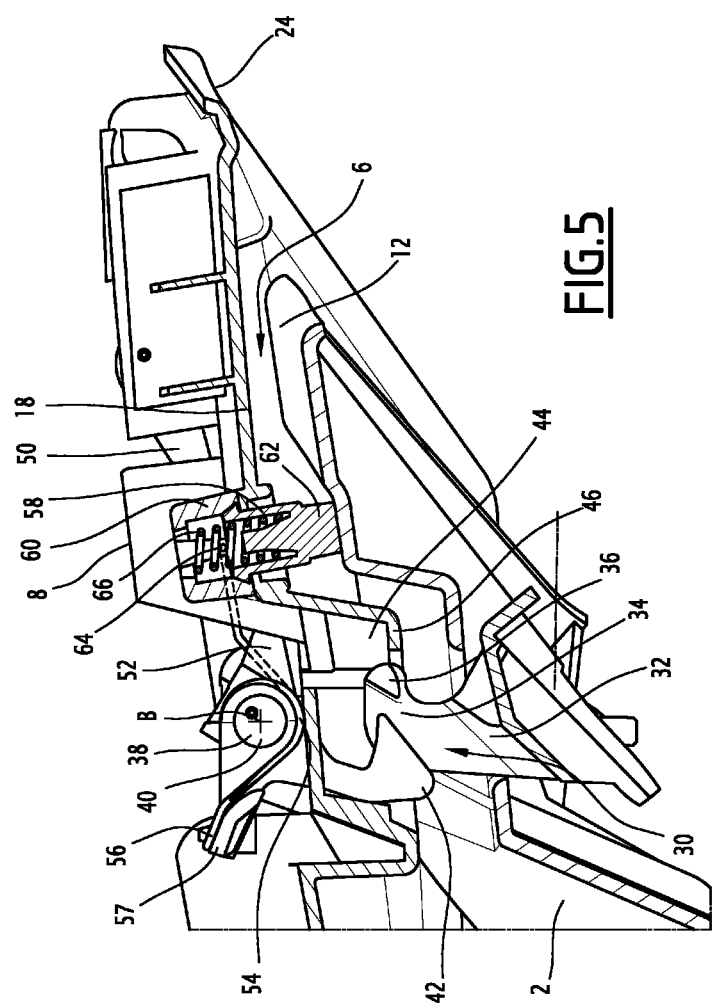
FIG. 5 is a diagrammatic cross-sectional illustration of the part of the storage device of FIG. 4, the cover being in the partially open position, the push-piece being made according to an alternative embodiment.

The locking mechanism 30 also comprises a locking element 38 rotatably mounted around a transverse axis B in the cover 8. The locking member 38 is rotatable between a locked position, in which it cooperates with the retaining element 32 (FIG. 4) so as to keep the cover 8 in the closed position, and an unlocked position, in which the locking element 38 is spaced away from the retaining element 32 (FIG. 5) so as to allow the cover 8 to go from its closed position to its open position. According to the embodiment shown in the figures, the locking element 38 is formed by a shaft 40 extending substantially transversely between the retaining elements 32, opposite them and between the inner wall 18 and the outer wall 20 of the cover 8, in the vicinity of the rear edge 24 thereof. At both of its ends, the shaft 40 bears a strike 42 protruding from the inner wall 18 of the cover 8, substantially perpendicular thereto and able to cooperate with the bolt 36 of the retaining element 32 arranged opposite the closed position of the cover 8, as shown in FIG. 4. Thus, in the closed position of the cover 6, the locking mechanism 30 is in the locked position, in which the strikes 42 cooperate with the bolts 36 to keep the cover 6 in the closed position and prevent it from opening, as shown in FIG. 4. During the transition to the unlocked position, the shaft 40 rotates around the transverse axis B, which results in moving the strike 42 of the corresponding bolt 36 away in the forward direction, as shown in FIG. 5.

The strike 42 extends in a housing 44 provided in the inner wall 18 of the cover and in which the retaining element 32 places itself when the cover 8 is in the closed position. This housing 44 comprises a shoulder 46 extending substantially parallel to the bottom 16 toward the front, so as to be opposite the recess 34 of the retaining element 32 when the cover 8 is in the closed position, as shown in FIG. 4. During normal operation, the recess 34 is spaced away from the shoulder 46 in the longitudinal direction so as to allow the cover 6 to move toward its open position. In the event of an impact, for example against the front of the motor vehicle, longitudinal deformation of the storage device causes a relative movement of the retaining element 32 with respect to the cover 8. The retaining element 32 then comes closer to the shoulder 46, which results in causing the recess 34 of the retaining element 32 to cooperate with the shoulder 46. In this way, the cover 8 is firmly maintained relative to the storage body 2 and cannot move into the open position. Such an arrangement offers great security, while preventing the cover from forming an obstacle in the passenger compartment of the motor vehicle if the impact were to move it into the open position.

An actuating member 48 allows the user to move the locking mechanism 30 from the locked position to the unlocked position. The actuating member 48 is for example made up of a tongue 50 rotatably mounted on the cover 8 and extending under the rear edge 24 thereof, as shown in FIG. 2. Part of the tongue 50 extends between the inner wall 18 and the outer wall 20 of the cover and can bear on a complementary tongue 52 of the shaft 40 to rotate the latter toward its unlocked position. Thus, to open the storage device 1, the user presses on the tongue 50 and lifts the cover 8 in the same movement, as shown in FIG. 1.

Figure 3:
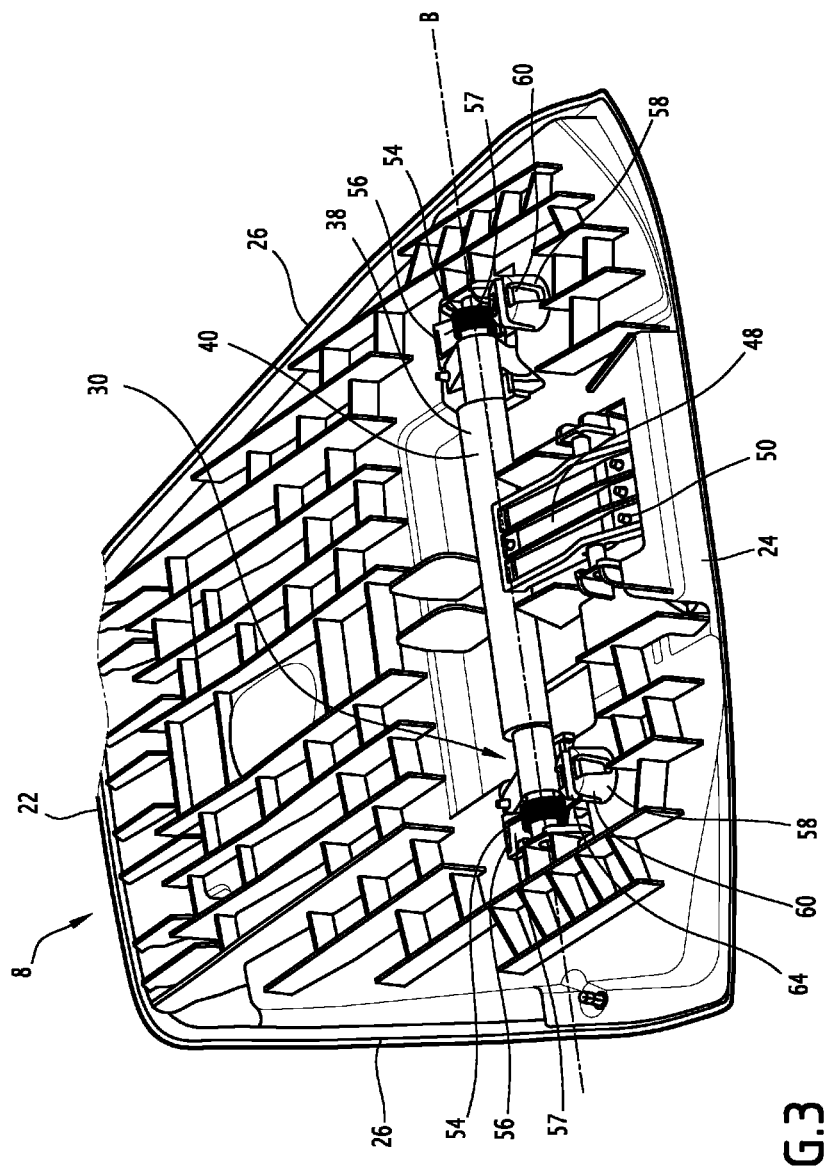
FIG. 3 is a diagrammatic perspective illustration of FIG. 2, seen from above, the trim element of the cover having been removed.

At least one return member 54 is arranged around the shaft 40 to return the locking element 38 to the locked position when the actuating member 48 is not actuated. This return member 54 is formed by a spring wound around the shaft 40 in the vicinity of a strike 42 and comprises a first end portion 56 bearing on a surface 57 of the cover 8 so as to return the locking element 38 to the locked position. The rotation of the actuating member 48 is therefore done against the return force of the return member 54 and the latter returns the locking element 38 to the locked position and the tongue 50 of the actuating member 48 to its initial position when said tongue 50 is not actuated by a user, as shown in FIGS. 4 and 5. According to the embodiment shown in the figures, and as more particularly shown in FIG. 3, the storage device comprises two return members 54 each arranged at an end portion of the shaft 40 in the vicinity of a strike 42.

The storage device 1 also comprises at least one push-piece 58, arranged between the cover 8 and the storage body 2, formed from a body 60 extending substantially perpendicular to the inner surface 18 of the cover 8 towards the storage space 4 and a head 62 translatably mounted in the body 60 along an axis substantially perpendicular to the inner wall 18 of the cover 8. The head 62 is movable between a retracted position (FIG. 4), in which the head 62 is retracted in the body 60 and allows locking of the locking mechanism 30, and an extracted position (FIG. 5), in which the head 62 exits the body 60 and bears against the bottom 16 of the storage body 2, such that when the cover 8 is folded down against the storage body 2, the cover 8 is kept in a partially open position. The head 62 is stressed into its extracted position by the return member 54, which returns the locking element 38 to the locked position. To that end, the return member 54 comprises a second end portion 64 that bears on the head 62 so as to push the latter toward its extracted position, as shown in dotted lines in FIG. 5. The advantage of the presence of such a push-piece 58 is described in document FR-2 935 320. The push-piece 58 in particular makes it possible to indicate to the user whether the cover 8 is closed correctly. In fact, in the extracted position, the push-piece 58 creates a space between the rear edge 24 of the cover 8 and the rear edge 12 of the storage body 2. If the user observes the presence of that space, this indicates to said user that the locking mechanism 30 is not correctly engaged and that the closed position of the cover 8 is not locked. Furthermore, the push-piece 58 offers opening assistance.

According to the embodiment shown in the figures, the storage device 1 comprises two push-pieces 58 arranged on either side of the cover in a transverse direction in the vicinity of the strikes 42, such that the two return members 54 make it possible to push the heads 62 of said push-pieces 58.

Thus, a single return member 54 makes it possible both to return the locking mechanism 30 to the locked position and to push the push-piece 58 toward its extracted position, which simplifies the storage device 1 and limits the number of component parts thereof, thereby facilitating assembly.

Furthermore, the push-piece 58 extends under the cover and is not directly visible during opening of said cover 8, which improves the esthetics of the storage device.

According to one embodiment shown in FIG. 5, the push-piece 58 also comprises a compression spring 66 provided between the head 62 and the body 60 of the push-piece 58. The spring 66 is arranged to push the head 62 toward its extracted position. Such a compression spring 66 makes it possible to increase the thrust force of the push-piece 58 against the storage body 2 without requiring that the force from the return member 54 be increased, i.e. modifying the force exerted on the strike 42 to lock the cover. Such a compression spring 66 therefore makes it possible to improve the opening assistance of the push-piece 58.

The invention claimed is:

1. An inner storage device for a motor vehicle, comprising a storage body, delimiting a storage area accessible through an opening, and a cover movable between an open position, in which the storage area is accessible, and a closed position, in which the cover closes off the opening, said device also comprising a locking mechanism movable between a locked position, in which said locking mechanism keeps the cover in the closed position, and an unlocked position, in which the locking mechanism allows the cover to go from its closed position to its open position, an actuating member making it possible to bring said locking mechanism from its locked position to its unlocked position when said actuating member is actuated, at least one elastic return member being arranged to return the locking mechanism to the locked position when the actuating member is not actuated, said device also comprising at least one push-piece arranged between the cover and the storage body, said piece being movable between a refracted position and an extracted position in which the push-piece keeps the cover in a partially open position, characterized in that the elastic return member is also arranged to push said push-piece toward its extracted position when the locking mechanism is in the unlocked position.

2. The storage device according to claim 1, characterized in that the locking mechanism comprises at least one retaining element secured to the storage body and a locking element rotatably mounted on the cover, said locking element cooperating with the retaining element in the locked position and being spaced away from said retaining element in the unlocked position.

3. The storage device according to claim 2, characterized in that the elastic return member is mounted around an axis of rotation of the locking element and comprises a first end part bearing on a surface of the cover so as to return the locking element to the locked position and a second end part bearing on the push-piece so as to push it toward its extracted position.

4. The storage device according to claim 2, characterized in that the actuating member is rotatably mounted on the cover and comprises a tongue bearing on the locking element so as to cause it to go to an unlocked position against the return force of the return member when the actuating member is actuated, said tongue being returned to its initial position by the locking element when the actuating member is not actuated.

5. The device according to claim 2, characterized in that the retaining element comprises a bolt and the locking element comprises a strike.

6. The storage device according to claim 5, characterized in that the locking mechanism comprises two retaining elements arranged on either side of a storage body in a transverse direction, the locking element comprising a shaft extending transversely and comprising a strike at each of its end portions, said strikes each cooperating with an element for retaining the locking position.

7. The storage device according to claim 2, characterized in that the retaining element is hook-shaped, the cover comprising a shoulder arranged across from the retaining element, the retaining element cooperating with said shoulder in case of deformation of the storage device causing a relative longitudinal movement of the cover relative to the storage body bringing the shoulder closer to the retaining element.

8. The storage device according to claim 1, characterized in that the push-piece comprises a body secured to the cover and a head translatable relative to the body along an axis substantially perpendicular to the cover, the return member exerting a thrust on said head so as to push it toward its extracted position.

9. The storage device according to claim 8, characterized in that a compression spring is mounted between the body and the head, said spring pushing the head toward its extracted position.

10. The storage device according to claim 1, characterized in that it comprises two push-pieces arranged on either side of the cover in a transverse direction, two return members being arranged each to push a push-piece toward its extracted position and to return the locking mechanism to the locked position when the actuating member is not actuated.

11. The storage device according to claim 1, characterized in that the cover is rotatably mounted relative to the storage body around a transverse axis of rotation extending near a front transverse edge of said storage body, the locking mechanism, the actuating member, the push-piece and the return member being arranged near the opposite rear transverse edge of the storage body.

\* \* \* \* \*